(12) United States Patent
Kano et al.

(10) Patent No.: US 11,820,676 B2
(45) Date of Patent: *Nov. 21, 2023

(54) METHOD FOR PRODUCING ULTRAPURE WATER

(71) Applicant: Merck Patent GmbH, Darmstadt (DE)

(72) Inventors: Ichiro Kano, Montigny le Bretonneux (FR); Yann Ratieuville, Paris (FR)

(73) Assignee: Merck Patent GmbH, Darmstadt (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/481,539

(22) PCT Filed: Feb. 12, 2018

(86) PCT No.: PCT/EP2018/053439
§ 371 (c)(1),
(2) Date: Jul. 29, 2019

(87) PCT Pub. No.: WO2018/146308
PCT Pub. Date: Aug. 16, 2018

(65) Prior Publication Data
US 2020/0024155 A1    Jan. 23, 2020

(30) Foreign Application Priority Data
Feb. 13, 2017   (EP) ..................... 17290015

(51) Int. Cl.
| | | |
|---|---|---|
| *B01J 47/04* | (2006.01) | |
| *C02F 1/42* | (2023.01) | |
| *C02F 103/04* | (2006.01) | |
| *C02F 9/20* | (2023.01) | |
| *C02F 1/28* | (2023.01) | |
| *C02F 1/44* | (2023.01) | |
| *C02F 1/469* | (2023.01) | |

(52) U.S. Cl.
CPC ............... *C02F 1/42* (2013.01); *B01J 47/04* (2013.01); *C02F 1/283* (2013.01); *C02F 1/441* (2013.01); *C02F 1/444* (2013.01); *C02F 1/4691* (2013.01); *C02F 9/20* (2023.01); *C02F 2001/427* (2013.01); *C02F 2103/04* (2013.01)

(58) Field of Classification Search
CPC .... B01D 47/04; C02F 1/444; C02F 2001/427; C02F 2103/04
See application file for complete search history.

(56) References Cited

U.S. PATENT DOCUMENTS

| | | | |
|---|---|---|---|
| 4,421,652 A | 12/1983 | Heskett | |
| 4,430,226 A | 2/1984 | Hegde et al. | |
| 5,022,994 A | 6/1991 | Avery et al. | |
| 5,073,268 A * | 12/1991 | Saito | C02F 1/20 |
| | | | 210/651 |
| 5,250,187 A | 10/1993 | Franks | |
| 5,464,532 A | 11/1995 | Nowlin et al. | |
| 5,552,056 A | 9/1996 | Ragosta | |
| 5,645,727 A | 7/1997 | Bhave et al. | |
| 5,868,924 A | 2/1999 | Nachtman et al. | |
| 7,670,676 B2 | 3/2010 | Horiishi et al. | |
| 9,023,185 B2 | 5/2015 | Gifford et al. | |
| 2002/0026675 A1 | 3/2002 | Kravtchenko et al. | |
| 2002/0179508 A1 | 12/2002 | Nachtman et al. | |
| 2003/0127388 A1* | 7/2003 | Ando | C02F 1/441 |
| | | | 210/636 |
| 2007/0151924 A1* | 7/2007 | Mir | B01D 63/08 |
| | | | 210/321.88 |
| 2008/0041790 A1 | 2/2008 | Rajan et al. | |
| 2008/0210606 A1 | 9/2008 | Burbank et al. | |
| 2008/0264868 A1 | 10/2008 | Murray et al. | |
| 2008/0314763 A1 | 12/2008 | Saito et al. | |
| 2009/0008318 A1 | 1/2009 | Anes et al. | |
| 2009/0101586 A1 | 4/2009 | Brings et al. | |
| 2009/0218289 A1 | 9/2009 | Brings et al. | |
| 2010/0130626 A1* | 5/2010 | Fukui | C08F 8/32 |
| | | | 521/29 |
| 2011/0245127 A1 | 10/2011 | Suzuki et al. | |
| 2014/0263072 A1 | 9/2014 | Voigt et al. | |
| 2015/0238908 A1 | 8/2015 | Ding et al. | |
| 2015/0315055 A1* | 11/2015 | Chidambaran | E21B 43/2406 |
| | | | 166/266 |

(Continued)

FOREIGN PATENT DOCUMENTS

| | | |
|---|---|---|
| CA | 2960152 A1 | 3/2016 |
| CN | 1829563 A | 9/2006 |

(Continued)

OTHER PUBLICATIONS

Lenntech—Rohm and Haas Amberlite IRN150 product data sheet—accessed Apr. 11, 2021 (Year: 2021).*

(Continued)

*Primary Examiner* — Bradley R Spies
(74) *Attorney, Agent, or Firm* — NIELDS, LEMACK & FRAME, LLC

(57) ABSTRACT

The present invention relates to a method for producing purified water comprising a step of passing water through a mixed bed ion exchanger comprising beads having a diameter of less than 0.5 mm, as well as to a module comprising an ultrafiltration means and a mixed bed ion exchanger as defined above and a water treatment system for producing ultrapure water comprising ultrafiltration means and a mixed bed ion exchanger as defined above, wherein the ultrafiltration means is located upstream of said mixed bed ion exchanger.

11 Claims, 13 Drawing Sheets

(56) References Cited

U.S. PATENT DOCUMENTS

| | | |
|---|---|---|
| 2016/0115046 A1 | 4/2016 | Gifford et al. |
| 2016/0229711 A1 | 8/2016 | Boodoo et al. |
| 2018/0057370 A1 | 3/2018 | Lin |
| 2018/0214845 A1 | 8/2018 | Gluckman et al. |
| 2019/0217250 A1* | 7/2019 | Ichihara .............. B01D 61/142 |
| 2019/0314806 A1 | 10/2019 | Slagt et al. |
| 2020/0024156 A1 | 1/2020 | Kano et al. |
| 2020/0024157 A1 | 1/2020 | Kano et al. |
| 2020/0189938 A1 | 6/2020 | Kano et al. |

FOREIGN PATENT DOCUMENTS

| | | |
|---|---|---|
| CN | 202246289 U | 5/2012 |
| CN | 202297292 U | 7/2012 |
| CN | 202881021 U | 4/2013 |
| CN | 103359850 A | 10/2013 |
| CN | 103370283 A | 10/2013 |
| CN | 105036412 A | 11/2015 |
| EP | 0429661 A1 | 6/1991 |
| EP | 0880469 B1 | 3/2000 |
| EP | 1533033 A1 | 5/2005 |
| JP | 60-71098 A | 4/1985 |
| JP | 60-232208 A | 11/1985 |
| JP | 61-106306 A | 5/1986 |
| JP | 62-11593 A | 1/1987 |
| JP | 62-87702 A | 4/1987 |
| JP | 63-44988 A | 2/1988 |
| JP | 63-156591 A | 6/1988 |
| JP | 3-4345 Y2 | 2/1991 |
| JP | 3-151092 A | 6/1991 |
| JP | 4-78483 A | 3/1992 |
| JP | 4-244289 A | 9/1992 |
| JP | 4-293581 A | 10/1992 |
| JP | 10-216721 A | 8/1998 |
| JP | 3128249 B2 | 1/2001 |
| JP | 2001-515397 A | 9/2001 |
| JP | 2003-251118 A | 9/2003 |
| JP | 2003-266069 A | 9/2003 |
| JP | 2008-272713 A | 11/2008 |
| JP | 2009-541032 A | 11/2009 |
| JP | 2010-158606 A | 7/2010 |
| WO | 97/29048 A1 | 8/1997 |
| WO | 98/09916 A1 | 3/1998 |
| WO | 03/072221 A1 | 9/2003 |
| WO | 2005/011849 A2 | 2/2005 |
| WO | 2009/075666 A2 | 6/2009 |
| WO | 2013/151654 A1 | 10/2013 |
| WO | 2016/128107 A1 | 8/2016 |

OTHER PUBLICATIONS

Kun et al., "The Pore Structure of Macroreticular Ion Exchange Resins", Journal of Polymer Science, No. 16, pp. 1457-1469, 1967.
Office action dated Dec. 1, 2020 in co-pending U.S. Appl. No. 16/481,544.
International Search Report and Written Opinion dated Apr. 20, 2018 in corresponding PCT application No. PCT/EP2018/053439.
International Search Report and Written Opinion dated Mar. 26, 2018 in co-pending PCT application No. PCT/EP2018/053441.
International Search Report and Written Opinion dated Apr. 20, 2018 in co-pending PCT application No. PCT/EP2018/053467.
International Search Report and Written Opinion dated May 7, 2018 in co-pending PCT application No. PCT/EP2018/053442.
Lanxess "Product Information Lewatit NM 60 SG" Jan. 17, 2012.
Miller et al., "Understanding Ion-Exchange Resins for Water Treatment Systems", Suez Water Technologies, Feb. 1981.
European communication dated Mar. 25, 2021 in corresponding European patent application No. 18703354.3.
Dowex Monosphere MR-3 UPW: A Separable Uniform Particle Size Mixed Bed Ion Exchange Resin for Ultrapure Water Production, Mar. 1, 2007, https://www.lenntech.com/Data-sheets/Dowex-Monosphere-MR-3-UPW-L.pdf.
Office action dated Jun. 15, 2021 in co-pending U.S. Appl. No. 16/481,545.
Enntech Lewatit UltraPure 1292 MD Product Information, Oct. 13, 2011.
European communication dated Apr. 1, 2021 in co-pending European patent application No. 18703356.8.
European communication dated Jul. 1, 2021 in co-pending European patent application No. 18703355.0.
Final Rejection dated Apr. 14, 2021 in co-pending U.S. Appl. No. 16/481,544.
Chinese communication, with English translation, dated Aug. 13, 2021 in co-pending Chinese patent application No. 201880011711.5.
Japanese communication, with English translation, dated Oct. 1, 2021 in co-pending Japanese patent application No. 2019-543835.
Dupont, Amberlite IRN 150 Product Data Sheet, 2020.
Office action dated Sep. 17, 2021 in co-pending U.S. Appl. No. 16/481,544.
Final Rejection dated Mar. 16, 2022 in co-pending U.S. Appl. No. 16/481,544.
Final rejection dated Feb. 3, 2022 in co-pending U.S. Appl. No. 16/481,545.
Lanxess Sybron, "Product Information Ionac NM-60 SG", <http://lewatit.co.kr/pop/pdf/NM60SG.pdf>, Apr. 26, 2011.
Office action dated Jan. 14, 2022 in co-pending U.S. Appl. No. 16/481,547.
Dupont, Product Data Sheet, "AmberLite IRA410 Cl Ion Exchange Resin", Nov. 2019.
Japanese communication, with English translation, dated Nov. 9, 2021 in co-pending Japanese patent application No. 2019-543202.
European communication dated Feb. 4, 2022 in co-pending European patent application No. 18703607.4.
Japanese communication, with English translation, dated Nov. 26, 2021 in co-pending Japanese patent application No. 2019-543291.
Guojian, Functional Polymer Materials, Second Edition, Tongji University Press, Jun. 1, 2014.
Chinese communication, with English translation, dated Apr. 19, 2022 in co-pending Chinese patent application No. 201880011740.1.
Japanese communication, with English translation, dated Jul. 4, 2022 in co-pending Japanese patent application No. 2019-543835.
Office action dated Oct. 19, 2022 in co-pending U.S. Appl. No. 16/481,544.
Final Rejection dated Sep. 20, 2022 in co-pending U.S. Appl. No. 16/481,547.
Horie et al., Definitions of Terms Relating to Reactions of Polymers and to Functional Polymeric Materials. Pure Appl. Chem., 76(4);889-906, 2004.
European communication dated Jun. 15, 2023 in co-pending European patent application No. 18703356.8.
Final Rejection dated Jun. 23, 2023 in co-pending U.S. Appl. No. 16/481,544.
Notice of Allowance dated Aug. 24, 2022 in co-pending U.S. Appl. No. 16/481,545.
Notice of Allowance dated Jul. 21, 2023 in co-pending U.S. Appl. No. 16/481,547.
Office action dated Apr. 11, 2023 in co-pending U.S. Appl. No. 16/481,547.

* cited by examiner

Invention (UF + small bead)
First cartridge
- UF
- Small bead resin 8cm

Second cartridge
- Activated carbon 12.5 cm
- Small bead resin 12.5 cm

Prior art (Macroporous resin)
First cartridge
- Q-Gard T3

Second cartridge
- Quantum TEX

Invention (UF + small bead)
First cartridge
- UF+hydrophobic vent MF
- Small bead resin 8cm Second cartridge
- Activated carbon 12.5 cm
- Small bead resin 12.5 cm Invention (UF + standard resin + small bead resin)
- UF
- Standard resin 40 cm
- Small bead resin 10cm Prior art
- Standard resin 50 cm

METHOD FOR PRODUCING ULTRAPURE WATER

The present invention relates to a method for producing purified water comprising a step of passing water through a mixed bed ion exchanger comprising beads having a diameter of less than 0.5 mm, as well as to a module comprising an ultrafiltration means and a mixed bed ion exchanger as defined above and a water treatment system for producing ultrapure water comprising ultrafiltration means and a mixed bed ion exchanger as defined above, wherein the ultrafiltration means is located upstream of said mixed bed ion exchanger.

Laboratory ultrapure water is prepared from municipal water through a combination of several technologies. Typically, activated carbon, reverse osmosis, ion exchange resins, micro/ultrafiltration, ultraviolet irradiation and sterile grade microfiltration are used alone or in combination for purifying water. Ultrapure water polishing is the last step of water purification. Milli-Q® (a commercial product from Merck KGaA, Darmstadt, Germany) employs ion exchange resins, activated carbon, a photooxidation UV lamp, microfiltration and/or ultrafiltration.

Ultrapure water (or Type 1 water) is typically characterized by a resistivity of greater than 18 MΩ·cm (at 25° C.) and a value of total organic compound (TOC) of less than 20 parts per billion (ppb). Type 2 water is typically characterized by a resistivity of greater than 1.0 MΩ·cm and a TOC value of less than 50 ppb. Type 3 water is the lowest laboratory water grade, recommended for glassware rinsing or heating baths, for example, or to feed Type 1 lab water systems. It is characterized by a resistivity of greater than 0.05 MΩ·cm and a TOC value of less than 200 ppb.

Worldwide feed water quality is more and more challenging because of fouling matters and/or particles contamination. In addition, municipal water quality may change upon seasons and water supply source. In many cases the feed water is simply pre-treated by deionization (DI). Because of repeated regeneration processes the resin may be damaged in service DI bottles generating resin by-products and broken resin parts. Furthermore, organic and fouling matters may accumulate and be released over time.

In some geographies, tap water may also comprise significant amounts of fouling matters.

Feeding an ultrapure water production system with poorly pretreated water may result in fouling issues in the system. Such fouling matter may cover the active surface of ion exchange resins and block or slow ionic mass transfer. This may either be irreversible, i.e. a permanent fouling layer deposits on the resin, or reversible, i.e. the fouling layer is fragile and thus easy to remove when the quality of the water source is improved.

Today there are several solutions for dealing with feed water of poor quality. Typically, the consumable cartridges are adapted to the respective feed water quality:

For systems connected to Type 2 (water treated by electrodeionization (EDI)), Type 3 (water treated by reverse osmosis) or distilled water feed, the cartridge typically contains a combination of regular ion exchange resins. For systems connected to DI water (deionized water) feed an activated carbon fiber filter is added to reduce organic matters. Finally, if the system is connected to DI water feed with high organic burden, a cartridge combining a sediment filter, macroporous anion exchange resin (scavenger) and macroporous mixed bed resin is used in order to reduce fouling phenomena.

The objective of the present invention was to provide an improved method to eliminate or reduce fouling in ultrapure water production systems, in particular in case of dirty deionized water feed.

Surprisingly it was found that the use of a fouling resistant resin such as a small bead mixed bed resin, optionally in combination with ultrafiltration means, results in a very good performance in water treatment with extended lifetime of the consumable.

WO 98/09916 A1 describes an ultrapure water production system combining an ultrafiltration step (18) and an ion exchange step (34, 36).

The ultrafiltration module is located at the most upstream position of the flow schematic (18). Its purpose is to eliminate organic and inorganic colloids and solutes, allowing for reduction of organic load before the following oxidation step (30). The ion exchange step uses a mixture of anion exchange resin particles and cation exchange resin particles (mixed bed).

JP 10216721 A teaches colloidal substance removal at ultra-trace level by a combination of ultrafiltration (UF) and anion exchanger. This combination of UF and anion exchanger showed the best performance to remove ultra-trace silica while the form of silica.

CN 202246289 U discloses a drinking water system configuration for home use. In this system three containers are connected in series, containing a sediment filter, an activated carbon and an ion exchange resin bed, having a bead diameter of 0.8-0.9 mm and a bed height of 90 cm. The resin is supposed to be a cation exchange resin to soften water. UF is used as a last step for pathogenic microbe removal.

CN 202881021 U describes a water purification device including a quartz sand filter, an activated carbon tank, an ultrafilter and an ion exchange resin bed.

CN 202297292 U describes a pure water production system. Typically, a water system purifying tap water to pure water employs pretreatment, reverse osmosis, a storage tank, ion exchanger, germicidal light irradiation and sterile grade microfiltration. Here an ultrafiltration step is inserted between the tank and the ion exchanger to improve water quality as well as ion exchange resin life time, since water storage in tank causes microbial contamination which degrades ion exchange resin performance.

JP 3128249 B2 discloses a water recycling method for waste water after washing containing oil, particles, organics and minerals. The waste water is treated and recycled by applying ultrafiltration, activated carbon and ion exchange resin in series.

In the prior art documents, the use of a fouling resistant resin such as a small bead mixed bed resin is not described.

A first embodiment of the present invention is therefore a method for producing purified water comprising a step of passing water through a mixed bed ion exchanger comprising beads having a diameter of less than 0.5 mm.

According to the present invention, the term purified water refers to water of Type 1, Type 2 or Type 3, or DI (deionized) water, as defined above.

In a preferred embodiment the purified water is ultrapure water, i.e. Type 1 water, characterized by a resistivity of greater than 18 MΩ·cm (at 25° C.) and a value of total organic compound (TOC) of less than 20 parts per billion (ppb).

In an alternative embodiment the purified water is DI water. Conventional service DI is typically a bottle comprising regenerated mixed bed ion exchange resin, to which tap water is plugged. Depending on the application, filter may be placed before and/or after the resin bottle to pretreat water and/or eliminate particles. The use of mixed bed ion exchanger comprising beads having a diameter of 0.2 to 0.4 mm according to the present invention allows for improving service DI, by maintaining a high resistivity plateau throughout the lifetime of the DI until resistivity drops down to 1 MΩ·cm.

An ion exchanger is an insoluble matrix in the form of small beads, fabricated from an organic polymer substrate (ion-exchange resin).

According to the present invention, a gel-type ion exchanger is used, which comprises a mixture of anion exchange particles and cation exchange particles in the form of small beads, respectively ("mixed bed").

Typically, an anion exchange particle is capable of exchanging hydroxide anions with anions in solution. The cation exchange particles are capable of exchanging hydrogen ions with cations in solution. The mixture of anion exchange particles and cation exchange particles can also include particles of activated carbon which adsorb charged or non charged organic species which may be present in the water. In a preferred embodiment the mixed bed ion exchanger consists of a mixture of anion exchange particles and cation exchange particles.

The diameter of the beads of the mixed bed ion exchanger is less than 0.5 mm. In a preferred embodiment, the beads' diameter is 0.2 to 0.45 mm.

This diameter represents the diameter of the beads in their regenerated state. The given diameter represents the mean particle diameter.

Preferably, the anion exchange beads and the cation exchange beads are monodisperse, respectively. The size of the beads can be determined by microscopic imaging technique instrumentation such as Camsizer (Horiba Camsizer XL), Nikon SMZ-2T microscope or Olympus BX41 microscope with DP71 digital CCD camera and Cell imaging software.

Throughout the document the term "resin" or "resin bead" is used for the ion exchange material itself (i.e. the ion exchange beads), and the terms "resin bed" or "resin layer" are used for the resin bed to be used in a specific arrangement.

All ion exchange materials known to a person skilled in the art can be used in the present invention. Typically, ion exchange resins are based on copolymers of styrene and divinylbenzene. The copolymerization of styrene and divinylbenzene results in crosslinked polymers. The ion exchanging sites are then introduced after polymerization. For example, sulfonating allows the production of cation exchange resins with sulfonic acid groups and chloromethylation followed by amination leads to the introduction of quaternary amino functions for the production of anion exchange resins.

The manufacturing processes of ion exchange resins are well-established and a person skilled in the art is familiar with suitable steps, reagents and conditions.

In a preferred embodiment the mixed bed ion exchanger is based on styrene divinylbenzene. More preferably, the mixed bed ion exchanger is based on sulfonated styrene divinylbenzene copolymer (cation exchange) and styrene divinylbenzene copolymer modified with quaternary amino groups (anion exchange).

Typical capacities of the anion exchange resin may be for example 1 eq/L and for the cation exchange resin 2 eq/L. These numbers are however not limiting.

Typically, mixed bed ion exchangers comprise a mixture of anion and cation exchangers in a ratio so that they have equal capacities for both types of ions.

Commercially available ion exchange resins with small beads are for example:
DOW, DOWEX MONOSPHERE 99Ca/310, 290-317 μm, average 307 μm
DOW, DOWEX MONOSPHERE 99Ca/320, 302-352 μm, average 317±15 μm
DOW, DOWEX MONOSPHERE 99Ca/350, 317-382 μm, average 347±15 μm
DOW, DOWEX fine mesh, 50-100 mesh (300-150 μm)
Lanxess, Lewatit MDS200H (330 μm)
Lanxess, Lewatit K6287 (390 μm)
Mitsubishi, Diaion UBK530K 350 μm,
Mitsubishi, Diaion MS01SS (350 μm)
Mitsubishi, Diaion UMA 130J (300 μm).

Today, ready-to-use highly regenerated mixed bed ion exchange resins for pure water production with smaller bead size are not offered by ion exchange resin manufacturers. The resins listed above are typically sold for other applications, such as purification of sugar and related derivatives from crude sugar juice (cation exchange resins) or purification of biomolecules for pharmaceutical purposes by chromatography (anion exchange resins).

Therefore, such non-regenerated resins or resins which are not treated for ultrapure water production have to be regenerated and purified before use according to the present invention. A person skilled in the art is well aware of the necessary steps. For example, the following procedure can be used:

A preparation column is filled with resin and rinsed by a continuous flow of ultrapure water with 18.2 MΩ·cm and <5 ppb TOC at >60 BV/h (BV=bed volume) for >15 min. 2N HCl (for cation exchanger) or 2N NaOH (for anion exchanger) is passed at 4 BV/h for 1 hour. The column is rinsed by a continuous flow of ultrapure water with 18.2·MΩ cm and <5 ppb TOC at >60 BV/h for >15 min. The cation exchanger and the anion exchanger are mixed in a 1/1 isocapacity ratio.

The use of a small bead mixed bed resin according to the present invention is advantageous compared to the use of standard resins, showing an early resistivity drop. Surprisingly, gel-type small bead mixed bed resin shows a much better performance regarding water quality and its ability to maintain a resistivity of 18.2 MΩ·cm for a longer period of time.

The quantity of small bead mixed bed resin is selected by ion exchange kinetic performance, independently from its fouling resistance aspect. Within this regard the diameter and height of the resin bed are determined by the target flow rate of ultrapure water production. For example, small bead mixed bed ion exchange resin can be operated optimally at 0.89 cm/sec linear velocity, i.e. a 69 mm diameter column is suitable to treat water at a flow rate of 2 L/min. A typical standard resin gives water of 18 MΩ·cm (at 15° C.) with a 10 cm bed height at least, while small bead ion exchange resin achieves the same quality by half height of resin bed, when 1 MΩ·cm equivalent NaCl solution is fed to the column. Consequently, the resin bed height of small bead resin is more than 5 cm.

In a preferred embodiment the water is further passed through an ultrafiltration means, wherein the ultrafiltration means is located upstream of said mixed bed ion exchanger.

According to the present invention any ultrafiltration (UF) means known to a person skilled in the art can be used, such as a dead-end ultrafiltration means or a flushable and/or backwashable UF means, allowing to regenerate the membrane surface and prevent clogging. In such case, tangential flow filtration with a lower water recovery is typically applied.

Preferably, a dead-end ultrafiltration membrane is used, for example a dead-end hydrophilic ultrafiltration membrane or a wetted hydrophobic ultrafiltration membrane. In a very preferred embodiment the ultrafiltration means is a hollow-fiber ultrafiltration membrane. Such hollow-fiber membrane is preferred since this allows for a minimized volume of the device.

Typically, the ultrafilter is a tough, thin, selectively permeable membrane that retains most macromolecules above a certain size including colloids, microorganisms and pyrogens.

Ultrafilters are available in several selective ranges, typically defined via their NMWC (nominal molecular weight cut-off) or MWCO (molecular weight cut off), which defines the minimal molecular mass of molecules retained by the membrane by 90%. According to the present invention the cut-off may for example be at 5 kDa or larger. In a preferred embodiment the cut-off is between 10 kDa and 100 kDa.

A wide variety of molecular weight cut-offs is commercially available for flat sheet UF membranes, for example:

Flatsheet UF membranes (obtainable from Merck KGaA, Darmstadt, Germany):

| | Membrane material | Model | Molecular weight cut off |
|---|---|---|---|
| Ultracel | Regenerated cellulose | PLAC04710 | 1000 Da |
| | | PLBC04710 | 3000 Da |
| | | PLCC04710 | 5000 Da |
| | | PLGC04710 | 10 000 Da |
| | | PLTK04710 | 30 000 Da |
| | | PLHK04710 | 100 000 Da |
| Biomax | PES | PBCC04710 | 5000 Da |
| | | PBGC04710 | 10 000 a |
| | | PBTK04710 | 30 000 Da |
| | | PBQK04710 | 50 000 Da |
| | | PBHK04710 | 100 000 Da |
| | | PBMK04710 | 300 000 Da |
| | | PBVK04710 | 500 000 Da |

In a preferred embodiment, a hollow fiber ultrafiltration membrane is used as ultrafiltration means. Typically, such ultrafiltration means is a bundle of hollow fiber membranes. The outer diameter of the fibers is typically between 0.5 and 2.0 mm. Preferably, the outer diameter is between 0.7 and 0.8 mm.

In industrial water treatment field, hollow fiber membranes are used popularly thanks to the higher membrane packing density, instead of flat sheet membrane. Chemical-mechanical strength is strongly required, since aggressive flush/backwash and chemical washing are periodically executed to regenerate the membrane for permeability recovery.

Advantageous materials are PVDF and polysulfon.

Commercially available hollow fiber membrane modules are for example:

| Manufacturer | Model | Membrane material | Molecular weight cut-off | ID/OD | Membrane surface per module | Filtration mode |
|---|---|---|---|---|---|---|
| Toray | HFU-1020 | PVDF | 150 000 Da (0.01 μm) | NA | 29 m2 | Out-In |
| | HFS-1020 | PVDF | (0.05 μm) | NA | 29 m2 | Out-In |
| DOW | SPF-2860 | PVDF | (0.03 μm) | 0.7/1.3 mm | 51 m2 | Out-In |
| | SFP-2860XP | PDVF | (0.03 μm) | 0.7/1.3 mm | 51 m2 | Out-In |
| Asahi Kasei | UNA-620A | PVDF | NA | NA | NA | NA |
| | LOV-5210 | PAN | NA | NA | NA | NA |
| Membrana | W05-08N | PES | NA | NA | 8.7 m2 | Out-In |
| Polymem | UF-100LS1 | PS | 10 000 Da (0.008 μm) | NA/0.72 mm | 4.5 m2 | Out-In |
| | UF-100LS2 | PS | 100 000 Da (0.01 μm) | NA/0.72 mm | 4.5 m2 | Out-In |
| | UF-100LS3 | PS | 300 000 Da (0.08 μm) | NA/0.72 mm | 4.5 m2 | Out-In |
| Merck Millipore | CDUFHF05K | PS | 5000 Da | 0.5/0.8 mm | 0.4 m2 | Out-In |
| | CDUFBI001 | PS | 13 000 Da | 0.5/0.8 mm | 0.15 m2 | Out-In |

The ultrafiltration means is located upstream of the mixed bed ion exchanger, i.e. the water to be purified passes the ultrafiltration means before it passes the mixed bed ion exchanger. Within this regard, the ultrafiltration means and the mixed bed ion exchanger are preferably arranged directly in series.

The filtration surface of the ultrafiltration means is typically determined by its use condition. It is expected to have a low pressure drop when the filter is new and clean. Then the pressure drop increases by membrane clogging due to dirt holding. Chemical and mechanical cleaning of the UF membrane is often used in large scale industrial application, however it is not favorable to use such invasive mechanical process and introduction of chemical cleaning agents in delicate ultrapure water production processes.

Consequently, the UF membrane module in the present embodiment is typically single use. The membrane surface is chosen for low initial pressure drop as well as predicted pressure drop at the end of filter life with taking into account for membrane permeability. Since the UF permeability decreases at low temperature, it is necessary to consider water temperature range for correct surface determination. With the chosen range of UF cut-off, the fiber outer diameter and the target flow rate 2 L/min, UF surface is more than 1 m$^2$, preferably >1.5 m$^2$.

The combination of ultrafiltration means and the mixed bed ion exchanger is very advantageous since the life time of the mixed bed ion exchanger can be extended.

Typically, a hollow fiber UF membrane is conditioned wet during manufacturing and it must be kept wet during storage and life time of use, since a dried membrane becomes non-permeable for water. During the initial set up of the filter cartridge, as well as when accidental air intake occurs, air bubbles may block the active surface of filtration. This air cannot be evacuated from the upstream side of the membrane. Consequently, in such case, the filtration flow rate decreases or a higher filtration driving pressure is required. In order to avoid such phenomenon, the ultrafiltration means may comprise means for air evacuation.

Ultrafiltration cartridges may for example be equipped with an air vent cap (drain/vent port). The cap is slightly opened during the first use and opened periodically during life time of cartridges when significant air accumulation in cartridges is observed in order to allow for air escaping and liquid filling the cartridge body. Alternatively, the drain/vent port can be operated electromechanically for automating this action.

Alternatively, air evacuation can be achieved by including a hydrophobic vent membrane into the bundle of hydrophilic hollow fiber membranes (e.g. JP 1985232208, JP 1986196306, JP 1087087702). It is assumed that a partial leak in the ultrafiltration module still allows for sufficient performance of the invention, i.e. the present invention does not require full integrity of the UF module. Therefore, a hydrophobic vent membrane with a microfiltration grade (having a larger pore size than the ultrafiltration membrane) may be used for air venting.

Alternatively, when a small bypass leak is acceptable, air evacuation may also be done by creating a continuous bypass with a simple capillary, instead of using a hydrophobic vent membrane. In such case the performance and capacity of the method may be reduced, but may still be acceptable.

A further alternative solution for air evacuation is a bypass tube with a spring load check valve. The air locking phenomenon increases the internal pressure of the UF compartment thereby opening the check valve to release air in downstream direction. In such case the opening pressure of the bypass channel P2 should be set lower than the safety bypass pressure of the pump P1. When the upstream side of the UF module comprises air, the upstream pressure increases until it reaches opening pressure P2, resulting in the opening of the check valve and releasing pressure in the downstream direction of the UF membrane. After the release of air, the membrane gets wet enough for an adequate filtration flow rate with a transmembrane pressure smaller than P2, the check valve closes and the UF module is again capable of filtering the complete amount of water.

In this embodiment the bypass flow is also activated if the UF membrane is clogged during use, releasing a certain amount of unfiltered water into the ion exchange resin and activated carbon compartment, thereby slightly degrading the cartridge performance, and leading to a slight decrease in water quality because of the dilution of unfiltered water with filtered water.

In a further embodiment of the present invention, the ultrafiltration means therefore comprises means for air evacuation. Examples of means for air evacuation are a drain/vent port, a hydrophobic vent membrane, one or more capillary tubes and/or a bypass tube with a check valve.

In a further embodiment, the method according to the present invention comprises a step of passing water through an activated carbon bed located downstream of the ultrafiltration means and optionally downstream of the mixed bed ion exchanger.

Activated carbon is able to remove dissolved organics and chlorine. At its start-up the ultrafiltration means may release a relatively high amount of organic matter originating from its manufacturing process. These can advantageously be removed by activated carbon. Activated carbon is made of organic material porous particulates containing a maze of small pores, resulting in a highly developed surface. Organic molecules dissolved in water may enter the pores and bind to their walls by van der Waals forces.

According to the present invention natural activated carbon or synthetic activated carbon can be used. Natural activated carbon can be produced by treating vegetal products such as ground coconut shells carbonized at high temperature, resulting in irregularly shaped grains and elevated mineral extraction. Synthetic activated carbon is produced by the controlled pyrolysis of synthetic spherical beads. Preferably, synthetic activated carbon is used.

According to the present invention the activated carbon bed is situated downstream of the ultrafiltration means. Optionally, it may also be located downstream the mixed bed ion exchanger.

In other words, two alternatives are possible: In a first alternative, the activated carbon bed may be located between the ultrafiltration means and the mixed bed ion exchanger (i.e. water passes the ultrafiltration means, then the activated carbon bed and then the mixed bed ion exchanger). In a second alternative, the activated carbon bed is located after the ultrafiltration means and the mixed bed ion exchanger (i.e. water passes the ultrafiltration means, then the mixed bed ion exchanger and then the activated carbon bed).

In a preferred embodiment, the water passes through an additional mixed bed ion exchanger located downstream of the activated carbon bed.

The present invention is further directed to a method as defined above, characterized in that the method comprises a further step of treating water by reverse osmosis and/or a further step of treating water by electrodeionization, wherein the step of treating water by reverse osmosis and the step of treating water by electrodeionization are performed prior to the step of passing water through the mixed bed ion exchanger, and, if present, also prior to passing the water through the ultrafiltration means.

A person skilled in the art is familiar with the steps of reverse osmosis and electrodeionization.

The step of reverse osmosis (RO) may remove many contaminants in the water, such as particles, bacteria and organics >200 Dalton molecular weight. RO is typically performed using a semi-permeable membrane, rejecting such contaminants. Hydraulic pressure is applied to the concentrated solution to counteract the osmotic pressure. The purified water can be collected downstream of the membrane.

RO membranes are typically manufactured from cellulose acetate or thin-film composites of polyamide on a polysulfone substrate.

Electrodeionization combines electrodialysis and ion exchange process, resulting in a process which effectively deionizes water, while the ion-exchange media are continuously regenerated by the electric current in the unit. Electrodeionization allows for the effective removal of dissolved inorganics, up to a resistivity of above 5 MΩ·cm at 25° C. (corresponding to a total ionic contamination level of ca. 50 ppb). According to the present invention the use of an Elix® module is preferred for electrodeionization.

Water purification systems for producing ultrapure water are known and are normally made up of peripheral components like a supporting frame, water quality monitoring resources, a pump, solenoid valves and conductivity cells and a connecting mechanism for releasably mounting one or two purification cartridges by inter-engaging complementary connectors. Since over time, the purification media get exhausted and/or the membranes get clogged replacement is needed on a timely or water consumption basis.

Therefore, the media and/or membranes are typically packaged in cartridges to facilitate the correct exchange of these consumable media from the respective water purification system.

In a further embodiment the present invention therefore relates to a module comprising an ultrafiltration means and a mixed bed ion exchanger comprising beads having a diameter of less than 0.5 mm.

Such module can be used in a method as described above. The preferred embodiments of the mixed bed ion exchanger are as defined above.

Typically, these modules are replaceable cartridges comprising the respective media. The modules may be in the form of tubes, for example.

For establishing the contact with the water purification system the modules exhibit connectors enabling for a fluid-tight connection between the ports on the cartridge and the connectors on the system. A suitable connector is for example described in WO 2016/128107 A1.

Within the module the ultrafiltration means and the mixed bed ion exchanger are arranged in series. Optionally, a separating mesh or screen can be used in order to keep the media in place within the module and, in case of hollow fibers for ultrafiltration, in order to avoid clogging of the fibers by resin beads. The mixed bed ion exchanger is located downstream of the ultrafiltration means.

In a preferred embodiment the ultrafiltration means is a hydrophilic ultrafiltration membrane, optionally comprising means for air evacuation, such as a hydrophobic vent membrane, one or more capillary tubes and/or a bypass tube with a check valve, as defined above.

In a further preferred embodiment the mixed bed ion exchanger is a styrene divinylbenzene gel, as defined above.

The module according to the present invention may further comprise an activated carbon bed, as defined above. In such case, the activated carbon bed is located either between the ultrafiltration means and the mixed bed ion exchanger or downstream of the mixed bed ion exchanger. Optionally, a separating mesh or screen can be used in order to keep the media in place within the module.

The height of the different components in the tube are determined as described above. Typically, these are determined by the feed water quality to be achieved and the capacity of the cartridge.

For example, according to the standard resin specifications of UP6150 from Dow (a typical resin as mentioned above), a minimum resin bed height of 900 mm is required while the service flow rate is between 30 and 40 bed volume per hour (BV/h) for deionization and ultrapure water polishing. A typical laboratory ultrapure water system is designed to dispense 2 L/min. 3-4 L resin bed with the required bed height and bed volume to process 2 L/min requires a column inner diameter of 65.2 mm to 75.2 mm with a linear velocity (LV) of 1 cm/sec to 0.75 cm/sec (36 m/h to 27 m/h).

The same calculation for the resin Lanxess UP1292/1294 with a given specification of the minimum bed height of 600 mm and a flow rate of 48 BV/h, results in an optimal diameter of 73 mm and a linear velocity of 0.8 cm/sec (28 m/h).

Typical laboratory ultrapure water systems such as Milli-Q respect this rule leading to a column diameter of 69 mm.

The total resin bed height in the cartridge with standard resin is typically between 10 and 60 cm. Small bead ion exchange resin achieves the same quality with half the height of resin bed. Thus, the total resin bed height in the cartridge with small bead resin is typically between 5 and 30 cm.

Preferably, the total resin bed height is between 10 and 25 cm. In a very preferred embodiment the total resin bed height is between 10 and 20 cm.

Typically, the cartridges are in tube form having an inner diameter between 65 and 75 mm, preferably around 69 mm.

In a further embodiment the present invention relates to a water treatment system for producing ultrapure water comprising ultrafiltration means and a mixed bed ion exchanger comprising beads having a diameter of less than 0.5 mm, wherein the ultrafiltration means is located upstream of said mixed bed ion exchanger.

Water treatment systems are known in the art. They typically comprise peripheral components like a supporting frame, water quality monitoring resources, pumps, solenoid valves and conductivity cells. When the ultrafiltration means and the mixed bed ion exchanger are provided in modules and a connecting mechanism for releasably mounting one or more of such modules by inter-engaging complementary connectors is also required.

The present invention therefore also relates to water treatment system as defined above wherein the ultrafiltration means and the mixed bed ion exchanger are provided in a single module as defined above.

In an alternative embodiment, the ultrafiltration means and the mixed bed ion exchanger are provided in at least two modules. For example, the ultrafiltration means may be provided in a first cartridge and the mixed bed ion exchange resin in second cartridge. Alternatively, a first module may comprise the ultrafiltration means and mixed bed ion exchange resin, and a second module further mixed bed ion exchange resin.

The modules may be provided individually, or molded together.

The water treatment system may further comprise an activated carbon bed, as defined above.

Again, the ultrafiltration means, the activated carbon bed and the mixed bed ion exchanger may be provided in a single module, as defined above.

Alternatively, in a preferred embodiment, the activated carbon bed is provided in a further module, comprising the activated carbon bed alone or alternatively together with a mixed bed ion exchanger comprising beads having a diameter of less than 0.5 mm.

For example, the following combinations of modules are suitable according to the present invention:

In a first embodiment, the water purification system may comprise two modules: The first module comprises ultrafiltration means (i.e. a hydrophilic UF membrane) and a mixed bed ion exchanger comprising beads having a diameter of less than 0.5 mm. The second module, located downstream of the first module, comprises granular activated carbon and a mixed bed ion exchanger comprising beads having a diameter of less than 0.5 mm.

In a second embodiment, the water purification system may comprise three modules: The first module comprises ultrafiltration means (i.e. a hydrophilic UF membrane) and a mixed bed ion exchanger comprising beads having a diameter of less than 0.5 mm. The second module, located downstream of the first module, comprises a mixed bed ion exchanger comprising beads having a diameter of less than 0.5 mm. The third module, located downstream of the first and second module, comprises granular activated carbon and a mixed bed ion exchanger comprising beads having a diameter of less than 0.5 mm.

In a third embodiment, the water purification system may comprise two modules: The first module comprises ultrafiltration means (i.e. a flush/backwashable UF membrane module) and activated carbon. The second module, located downstream of the first module, comprises a mixed bed ion exchanger comprising beads having a diameter of less than 0.5 mm.

FIGURES

FIG. 7 compares the performance of a small bead mixed bed resin with with a state of the art solution according to Example 6: FIG. 7A shows the experimental setup, FIG. 7B the results of the experiment.

Figure 8A:
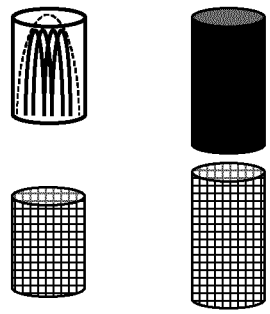
Figure 8B:
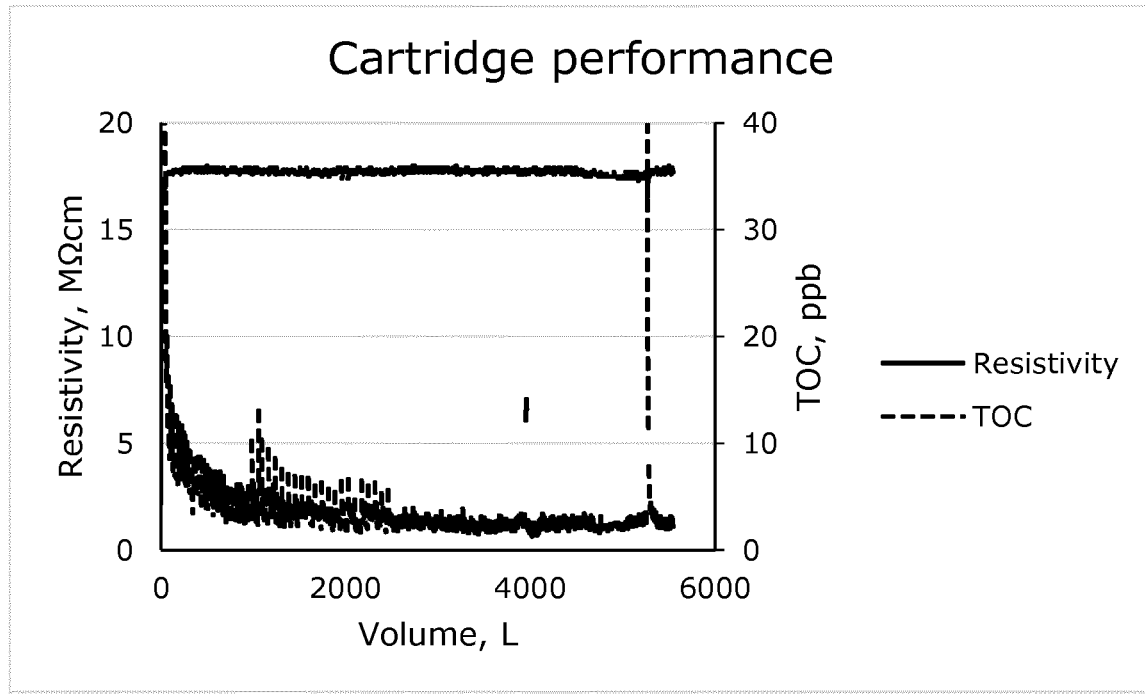

FIG. 8 shows the test configuration (FIG. 8A) and the results (FIG. 8B) of Example 7, testing the use of ultrafiltration means with hydrophobic vent.

Figure 9A:
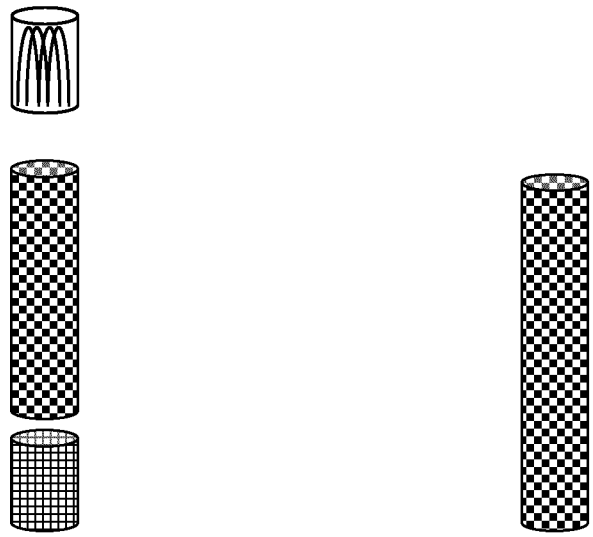
Figure 9B:
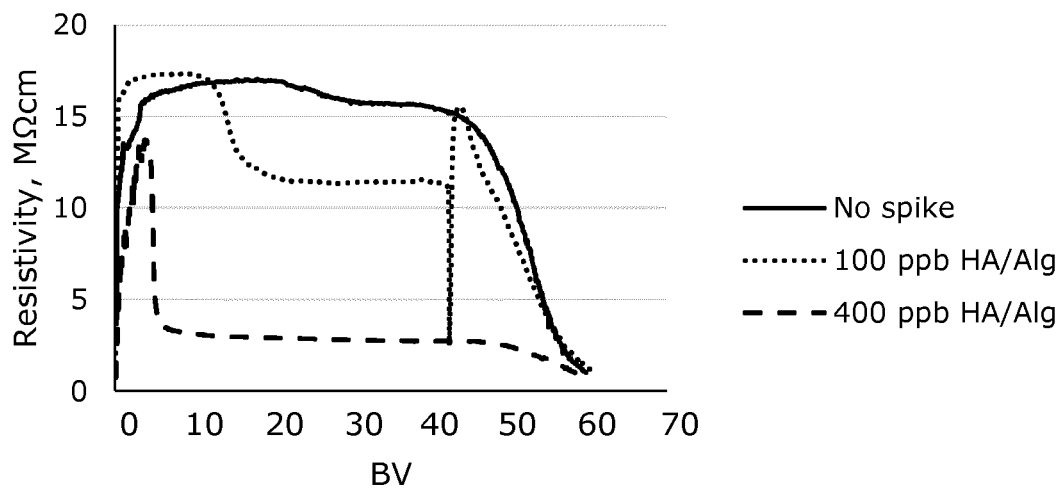
Figure 9C:
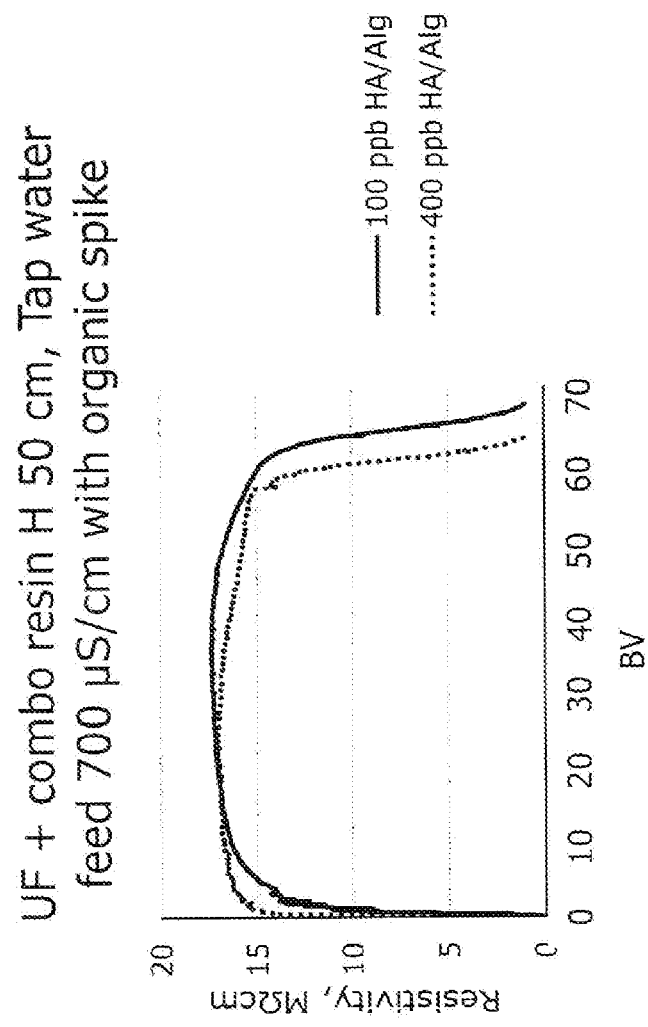

FIG. 9 shows the use of small bead mixed bed ion exchange resin in service DI condition according to Example 8: The test configuration is shown in FIG. 9A, the results for the prior art in FIG. 9B and the results according to the present invention in FIG. 9C.

EXAMPLES

Example 1: Experimental Setup for Simulating Fouling Conditions

For simulating fouling conditions in laboratory, humic acid (sodium salt, Sigma Aldrich) or sodium alginate (Sigma Aldrich) is spiked in water as model organic compound. The "dirty DI (deionized) water" is often ionically pure, thus its resistivity is at least 1 MΩ·cm, sometimes over 10 MΩ·cm.

Although such water seems to be very pure, it may contain fouling matters which are not detectable by a resistivity meter. In the following experiments, simultaneous in-line injection of 100 to 400 ppb of humic acid or alginic acid or a mixture of both and NaCl equivalent to 1 MΩ·cm into pure water is used to prepare artificial fouling water to evaluate purification media and solutions:

Artificial fouling water is prepared by injecting a mixture of NaCl (Merck EMSURE®) and humic acid (Sigma Aldrich) (concentration: 1 g/L NaCl, 0.24 g/L humic acid sodium salt) or a mixture of NaCl and sodium alginate (Sigma Aldrich) (concentration: 1 g/L NaCl, 0.24 g/L sodium alginate) into water purified by an Elix® 100 system (Merck KGaA, Darmstadt, Germany) and further deionized by a make-up polisher (Quantum TIX polishing cartridge, Merck KGaA, Darmstadt, Germany) with a precise injection pump (ISMATEC MCP-CPF process pump+PM0CKC pump head). The use of a defined ratio of NaCl/humic acid or alginate in the mixture allows for estimating the final concentration of humic acid or alginate by measuring the target conductivity of the artificial fouling water by a resistivity sensor (Thornton 770MAX) (R1): NaCl 406 ppb (=1 µS/cm), humic acid 100 ppb; or NaCl 406 ppb, alginate 100 ppb. Several cartridges containing ion exchange resins, adsorptive media and/or filtration devices are placed in series. Intermediate and final water quality is checked by further resistivity sensors (R2 and R3) and an Anatel A100 TOC analyzer.

Figure 1:
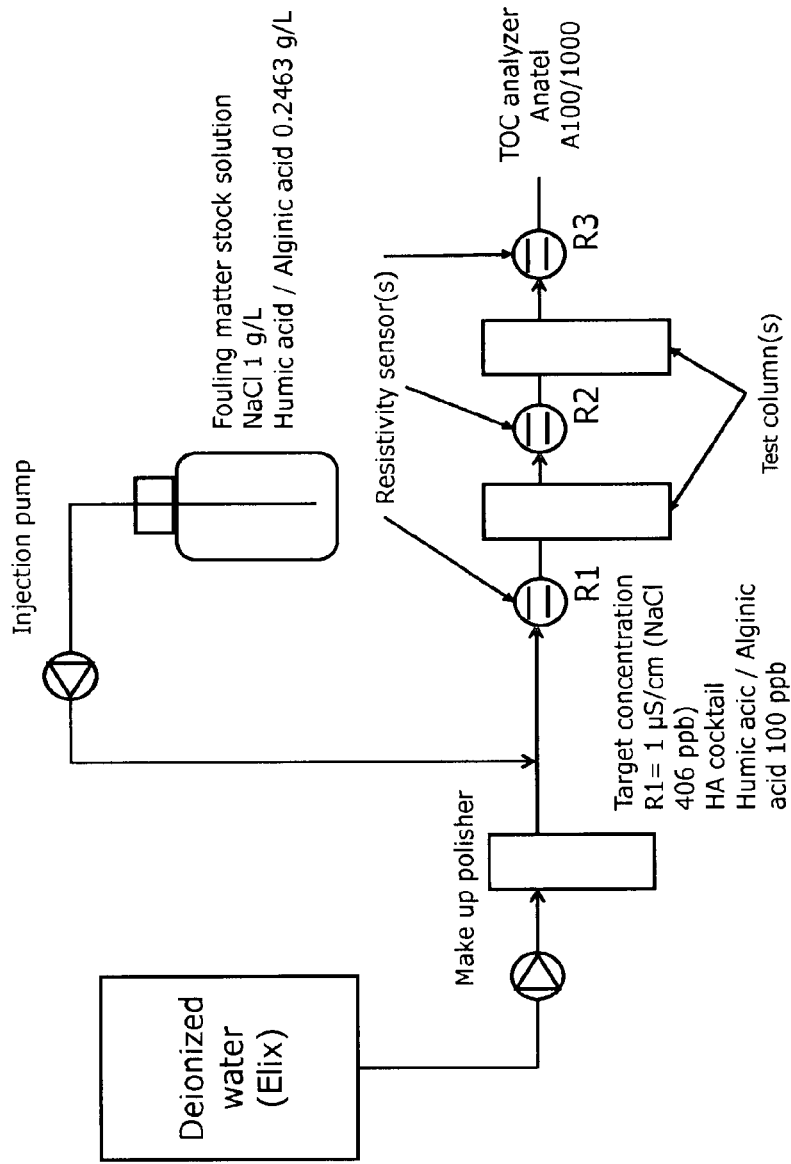
FIG. 1 shows the experimental setup for simulating fouling conditions, as described in Example 1.

The experimental setup is shown in FIG. 1.

Example 2: Fouling Resistance of Ion Exchange Resins

Different types of ion exchange resins alone are evaluated with the artificial fouling water. For this purpose mixed bed resins of 20 cm bed height are tested at 0.89 cm/s linear velocity with artificial fouling water with 100 ppb humic acid and 1 µS/cm feed condition (A) or artificial fouling water with 100 ppb alginate and 1 µS/cm feed condition (B), according to the experimental setup described in Example 1.

The following resins are tested (Table 1):

TABLE 1

| | Type | Bead diameter | Resin reference | |
|---|---|---|---|---|
| Standard resin | Styrene divinylbenzene gel type | 0.6-0.7 mm for both anion and cation exchangers | Jetpore ® (used in Milli-Q consumable cartridge) (Merck KGaA) | |
| Asymmetric resin | Styrene divinylbenzene gel type | 0.6-0.7 mm for anion, 0.3-0.4 mm for cation exchangers | MR450UPW (DOW) | |
| Macroporous resin | Styrene divinylbenzene macroporous resin | 0.6-0.7 mm for both anion and cation exchangers | IRN9882 (Rohm and Haas) | |
| Small bead resin | Styrene divinylbenzene gel type | 0.3-0.4 mm for both anion and cation exchangers | Anion exchanger K6387 (Lanxess) | Cation Exchanger MDS200H (Laxess) |

Non-regenerated small bead resins which are not treated for ultrapure water production are regenerated and purified according to the following procedure:

A preparation column is filled with resin and rinsed by a continuous flow of ultrapure water with 18.2 MΩ·cm and <5 ppb TOC at >60 BV/h (BV=bed volume) for >15 min.

2N HCl (prepared from 25% HCl (EMSURE, Merck KGaA)) (for cation exchanger) or 2N NaOH (prepared from 50% NaOH (EMSURE, Merck KGaA)) (for anion exchanger) is passed at 4 BV/h for 1 hour.

The column is rinsed by a continuous flow of ultrapure water with 18.2 MΩ·cm and <5 ppb TOC at >60 BV/h for >15 min.

Cation exchanger and anion exchanger are mixed in a 1/1 isocapacity ratio.

The mixed resin is stored in a heat-sealed plastic bag or a tightly closed bottle.

Figure 2A:
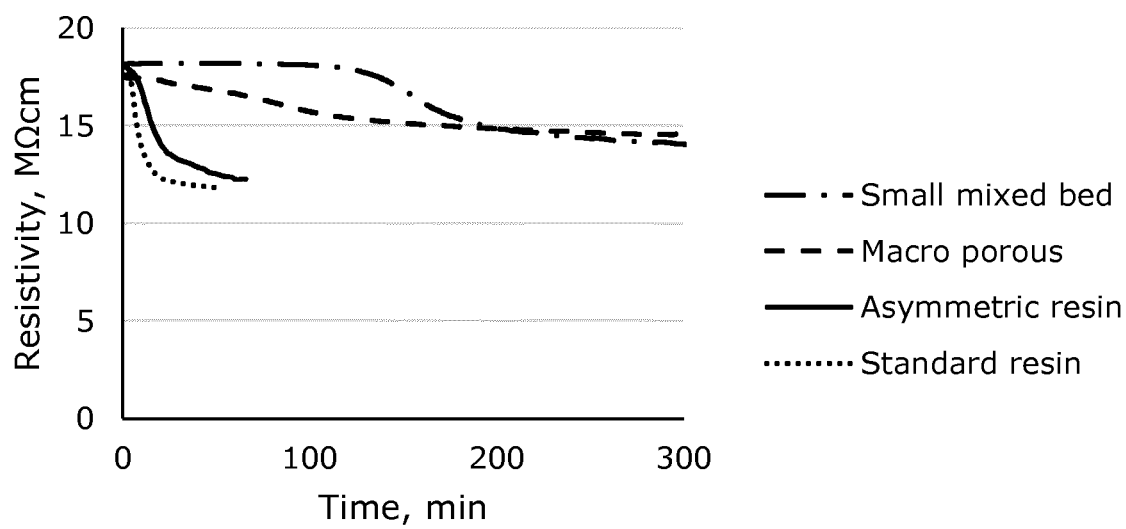
FIG. 2 shows the fouling resistance of different ion exchange resins by using artificial fouling water with humic acid (FIG. 2A) and artificial fouling water with alginic acid (FIG. 2B) according to Example 2.

The result for artificial fouling water with humic acid is shown in FIG. 2A:

While the standard resin and the asymmetric resin shows immediate resistivity drop due to humic acid impact, the macroporous resin and the small beads mixed bed resin bring water resistivity higher. Within this regard, the performance of the small beads mixed bed resin is even better, since it provides a higher water quality and has the ability to maintain 18.2 MΩ·cm for a longer time. Despite the fact that the asymmetric resin comprises a small bead cation exchange resin, it does not provide the same good results as the small bead mixed bed resin comprising both a small bead cation exchanger and a small bead anion exchanger.

Figure 2B:
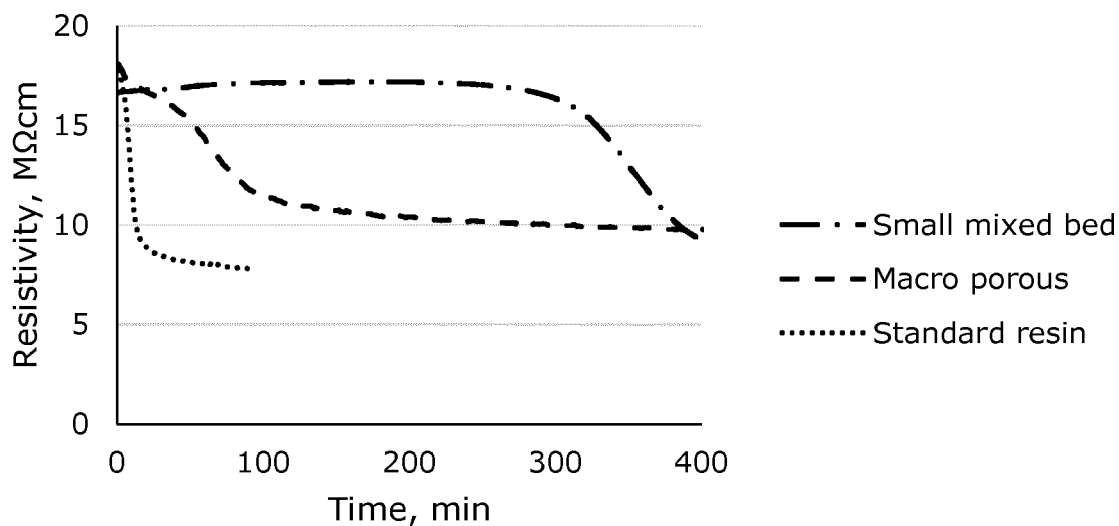

The result for artificial fouling water with sodium alginate is shown in FIG. 2B:

Similar trends as described for humic acid are seen in the test result—the small bead mixed bed resin is more resistant to fouling compared to the standard resin and the macroporous resin.

Example 3: Protection of Standard Ion Exchange Resin by Different Purification Media Since even the best resin is expected to have a limited capacity over time regarding fouling resistance, the following experiment is conducted in order to test its potential protection by other purification means.

For this purpose, in the experimental setup according to Example 1, different purification media are placed upstream of the standard ion exchange resin bed in order to compare their protection efficiency of the ion exchange resin against fouling matters.

The following purification media are tested:
Dead-End Filtration Media:
Hydrophilic PVDF membrane 0.22 µm Merck, Millipak40, cat. no. MPGL04SK1
Hydrophobic PVDF membrane 0.65 µm Merck, Millipak, cat. no. TANKMPK02
Hydrophilic PE hollow fiber membrane 0.1 µm, Mitsubishi Rayon Sterapore, cat. no. 40M0007HP
Polysulfon hollow fiber UF 13K Dalton, Merck, Biopak, cat. no. CDUFBI001
Polysulfon hollow fiber UF 5K Dalton, Merck, Pyrogard 5000, cat. no. CDUFHF05K
Adsorption Media:
Natural coconut granular activated carbon, Jacobi carbon, cat. no. PICAHYDRO S 35
Synthetic spherical activated carbon, Kureha, cat. no. G-BAC
Macroporous anion exchange resin, DOW, cat. no. IRA96SBC
Diatomaceous sand filter, Merck Polygard CE, cat. no. CE02010S06

Again, the tests are performed with artificial fouling water contaminated with humic acid (A) or artificial fouling water contaminated with alginate (B) according to the conditions described in Example 1.

Figure 3A:
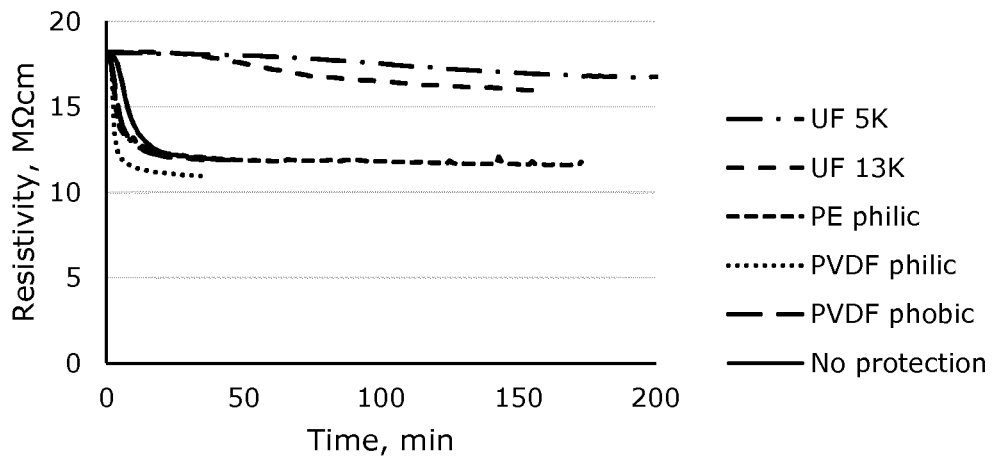
FIG. 3 shows the protection of standard ion exchange resin by different purification media for humic acid (FIG. 3A) and alginic acid (FIG. 3B) according to Example 3.
Figure 3A:
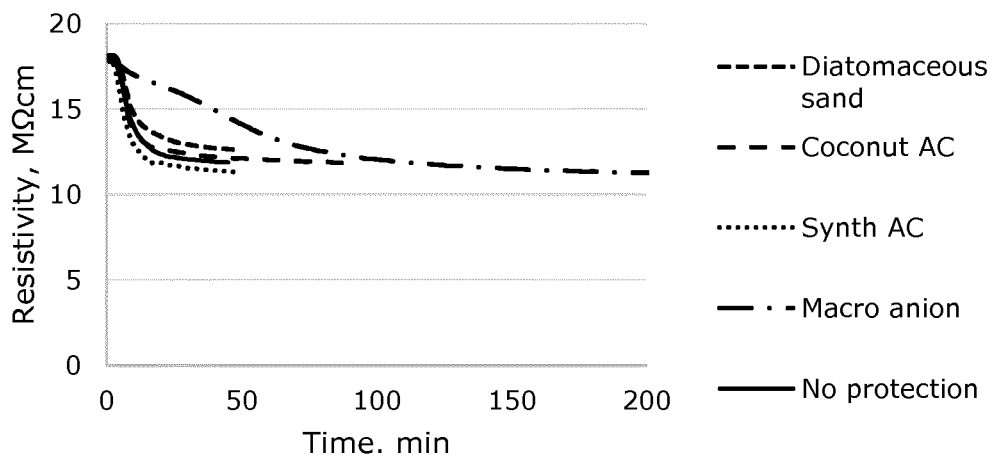
Figure 3B:
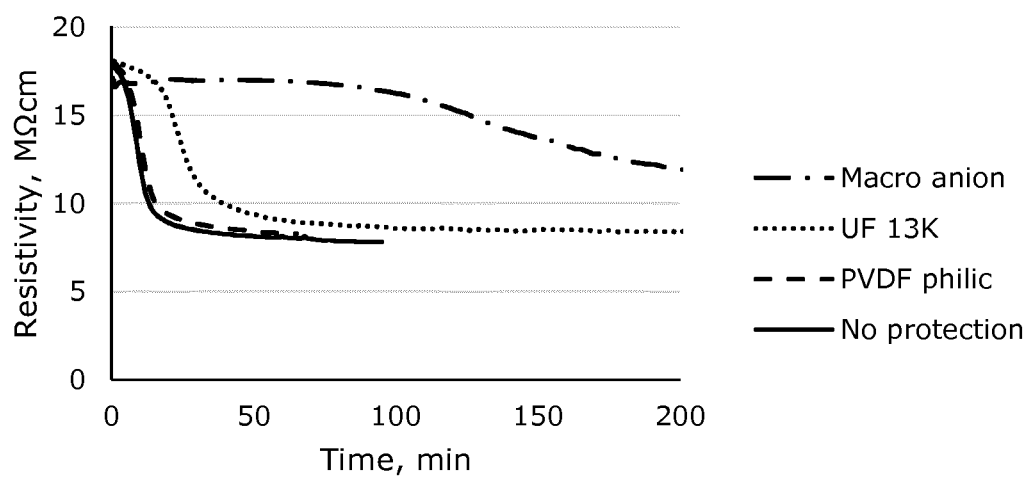

The results are shown in FIG. 3.

In the tests performed with humic acid contaminated artificial fouling water the ultrafiltration media Polysulfon hollow fiber UF 13K Dalton and Polysulfon hollow fiber UF 5K Dalton perform the best in protecting the standard ion exchange resin.

In the tests with alginate contaminated artificial fouling water macroporous anion resin shows the best performance in protecting standard resin. It is however expected that large molecular weight organic substances, simulated by alginate, are only minor relevant in organic contamination of natural water.

Example 4: Effect of Activated Carbon

Ultrafiltration media release significantly high TOC at start-up. It is assumed that the organic matters from UF are pure extractable portions from the membrane polymer, as well as solvent and additive from manufacturing processes. This experiment represents a simple rinsing test of the UF cartridge fed with Milli-Q water without fouling matter injection.

The following setup is used: UF 13 kDa cartridge (Merck, Biopak, cat. no. CDUFBI001) followed by 20 cm standard ion exchange resin bed is fed by Milli-Q water at 0.5 L/min. To demonstrate TOC removal from UF extractable by activated carbon, 8 cm height of synthetic activated carbon (Kureha G-BAC) is placed between UF and resin bed.

Figure 4:
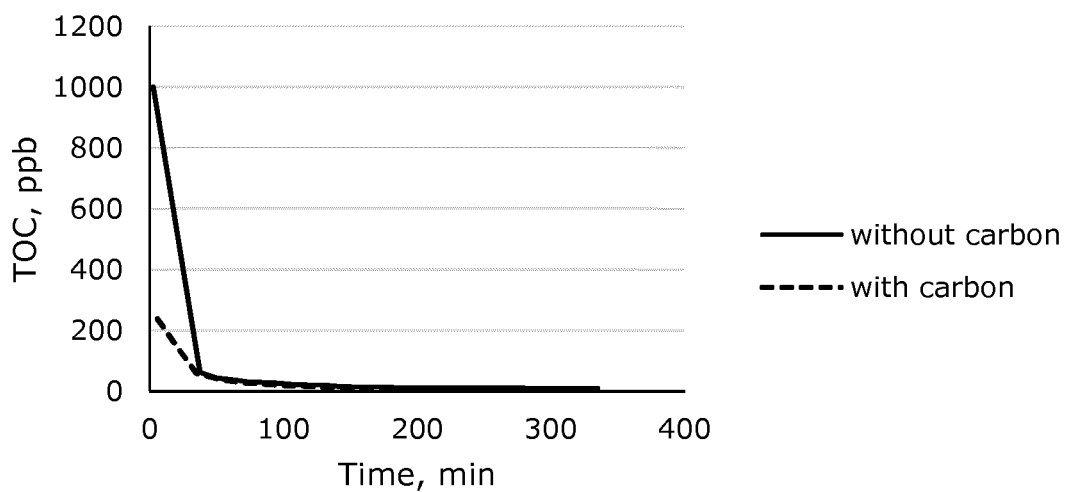
FIG. 4 shows the effect of activated carbon according to Example 4.
Figure 4:
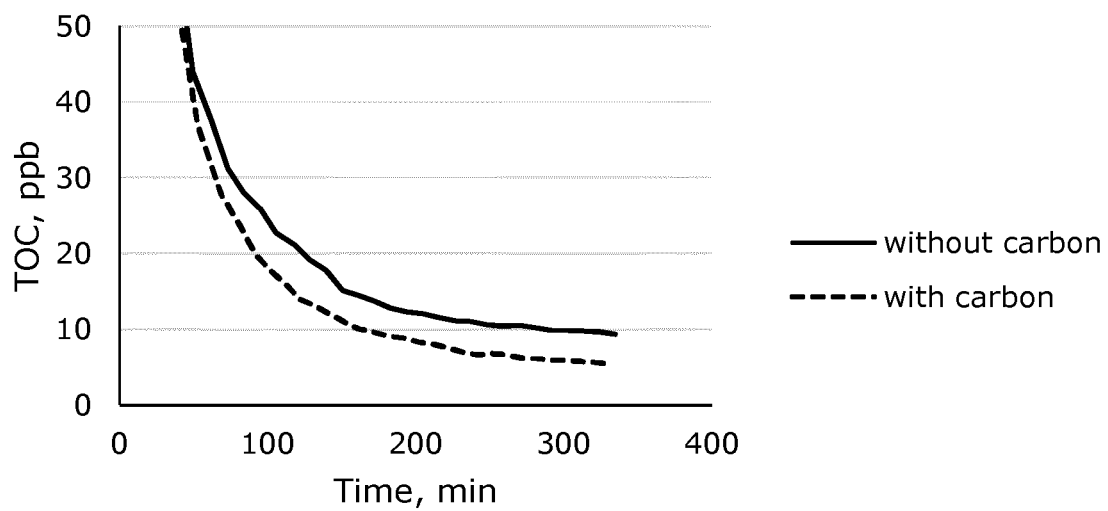

The results are shown in FIG. 4: The addition of activated carbon results in a strong reduction of the initial TOC value and a further reduction of the TOC bottom level by a factor 2 after rinsing stabilization.

Example 5: Comparison of the Use of a Small Bead Mixed Bed Resin with a State of the Art Solution In the following test the combination of media is tested in lab scale ultrapure water production systems. The following configurations are compared:
State-of-the-art solution for treating fouling water: commercially available Milli-Q® Advantage with Q-Gard T3, comprising a macroporous resin bed, combined with Quantum TEX Polishing Cartridge (Merck KGaA, Darmstadt, Germany), comprising a standard mixed bed ion exchange resin bed and synthetic activated carbon.
Solution according to the present invention using small bead resin as defined above, with and without ultrafiltration means (Biopak from Merck), and activated carbon.

Figure 5:
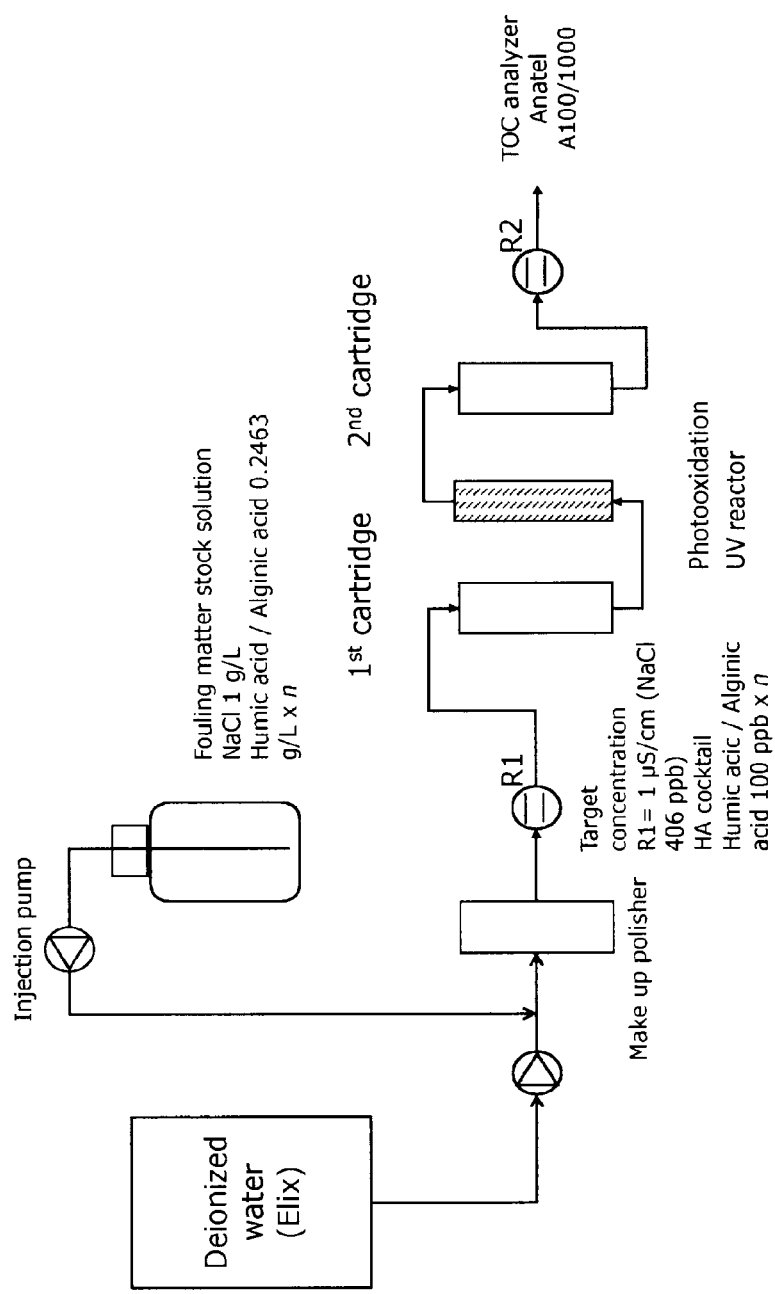
FIG. 5 shows the experimental set-up for the test according to Example 5.
Figure 6A:
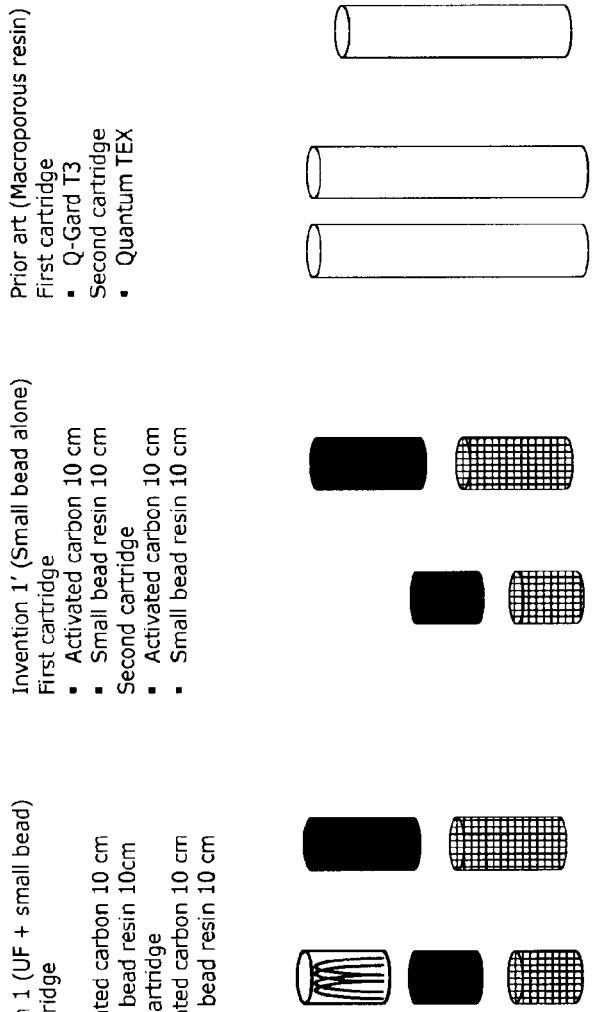
FIG. 6 shows the test configuration (FIG. 6A) and results (FIG. 6B) of a comparison of the use of a small bead mixed bed resin with a state of the art solution according to Example 5.

The experimental set-up is shown in FIG. 5. Test configurations are illustrated in FIG. 6A.

Artificial fouling water with humic acid is used as described in Example 1.

Figure 6B:
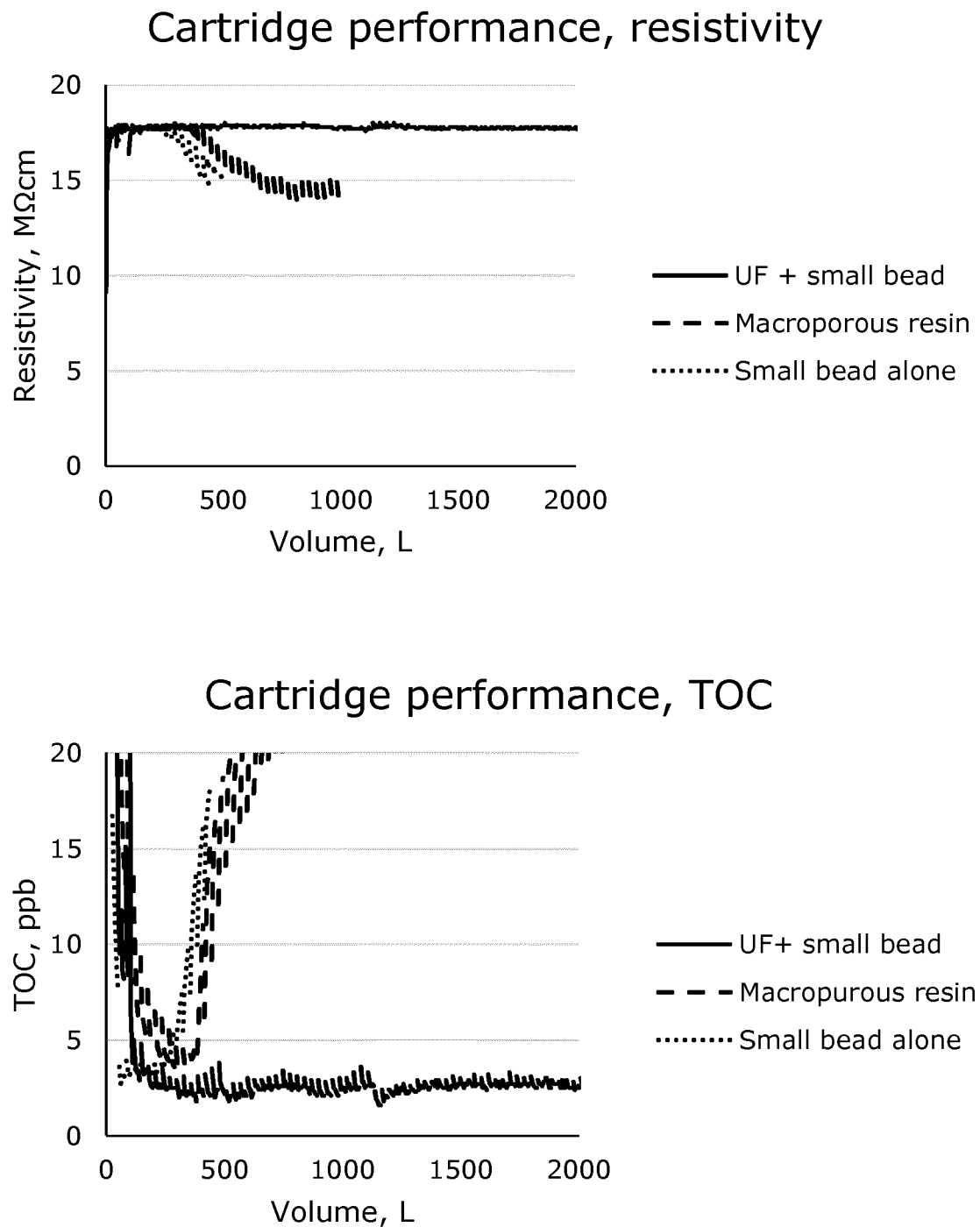

The results are shown in FIG. 6B: The use of a small bead mixed bed resin allows for a similar good performance regarding TOC content and resistivity as the state-of-the-art solution using macroporous resin. The addition of the ultrafiltration means even improves the capacity of the system.

Example 6: Comparison of the Use of a Small Bead Mixed Bed Resin with a State of the Art Solution The performance of of a small bead mixed bed resin with a state of the art solution is compared. The set-up of the experiment is as described for Example 1. For this purpose a first cartridge is used, containing the ultrafiltration module (height 16 cm) and the ion exchange resin bed (height 8 cm), and a second cartridge, containing activated carbon (12.5 cm) and ion exchange resin bed (12.5 cm) (see FIG. 7A).

The ion exchange resins used are small bead mixed bed ion exchange resins according to the present invention and a macroporous resin.

Figure 7A:
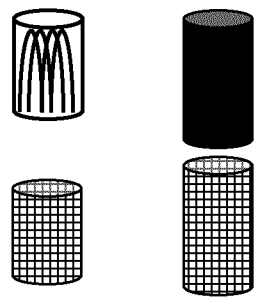
Figure 7A:
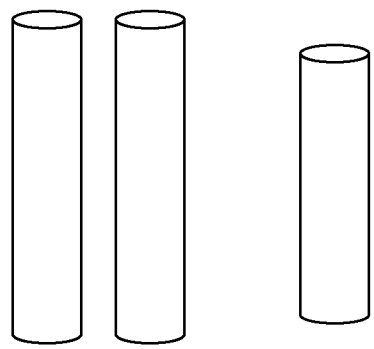
Figure 7B:
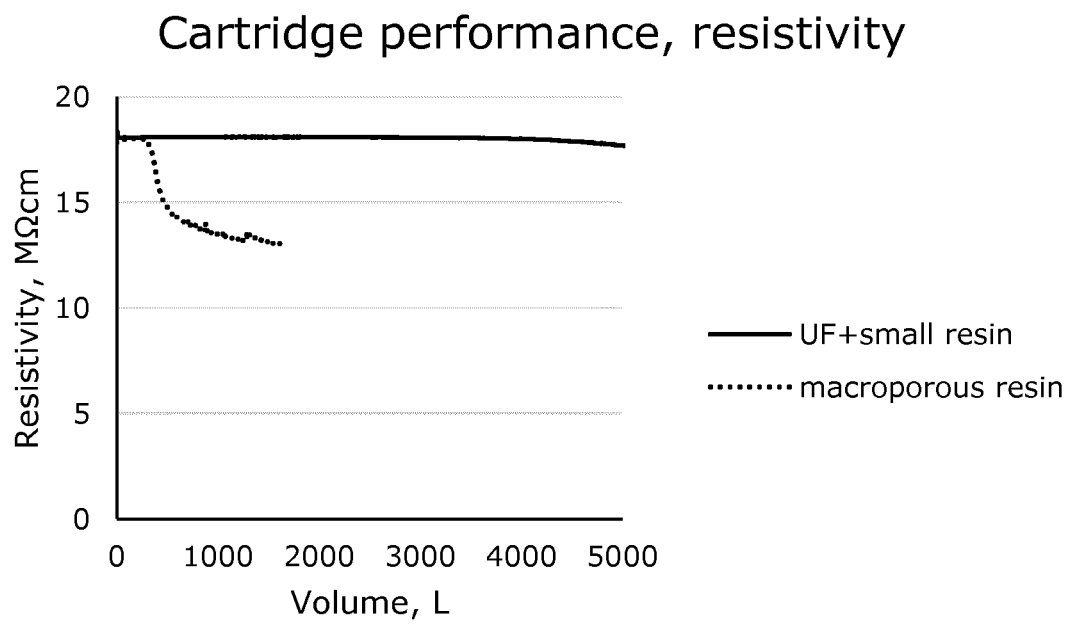
Figure 7B:
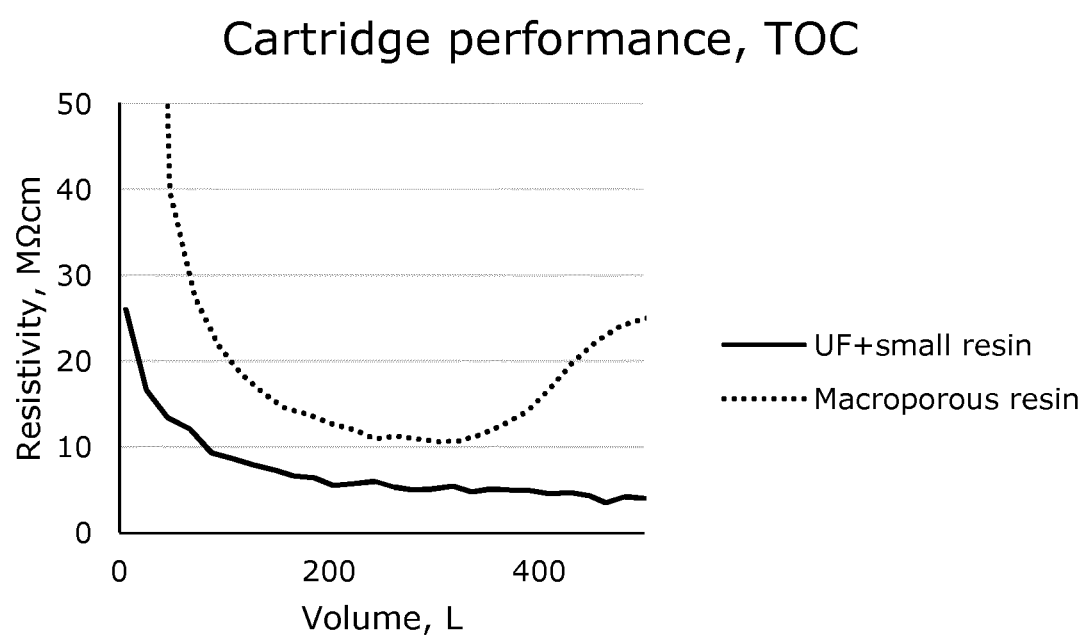

The results are shown in FIG. 7B: The combination of a small bead mixed bed resin with ultrafiltration means results in the best performance.

Example 7: Use of Ultrafiltration Means with Hydrophobic Vent

The experiment described in Example 5 is repeated, using an ultrafiltration means with a hydrophobic vent membrane. The configuration is shown in FIG. 8A.

The results are shown in FIG. 8B: The use of a hydrophobic vent membrane in the ultrafiltration means does not reduce resin performance and capacity significantly.

Example 8: Use of Small Bead Mixed Bed Resin in Service DI Condition

The following experiment demonstrates the use of small bead ion exchange resin for improving the water quality of service DI water. FIG. 9A shows the test configuration.

A conventional service DI bottle comprises a regenerated standard mixed bed ion exchange resin. The bottle is connected to a water tap and water is passed through the bottle driven by the tap water pressure. FIG. 9B shows a typical resin bed saturation curve when a resin bed of 50 cm height is operated at 0.445 cm/s linear velocity with 700 μS/cm conductivity with and without a fouling matter spike (humic acid and alginic acid).

Typically, a high resistivity plateau is observed when no organic matter is injected, whereas a short or no high resistivity plateau is seen when fouling matter is added. This is followed by a second intermediate resistivity plateau until resin bed saturation. Independent of the degree of organic pollution, resistivity finally converges at the same capacity value (BV=bed volume, i.e. 1 BV is one volume equivalent to resin bed volume), indicating that the contamination impacts the ion exchange kinetics, but doesn't influence the total ion retention capacity up to a set point of 1 MΩ·cm.

In the same experimental set-up ultrafiltration means is added upstream and a small bead mixed bed resin bed of 10 cm is added downstream to a standard mixed bed resin bed of 40 cm (700 μS/cm; linear velocity: 0.445 cm/s).

The result is shown in FIG. 9B: Due to the protection by UF and small bead resin, a high resistivity plateau can be maintained throughout the lifetime of the service DI until the resistivity drops to 1 MΩ·cm. This solution does not improve the capacity of water volume, but allows for producing water with a maximum quality until the quality finally dramatically drops because of resin saturation.

The invention claimed is:

1. A method for producing purified water comprising a step of passing water sequentially through an ultrafilter, a bed consisting of activated carbon, and a mixed bed ion exchanger, or sequentially through an ultrafilter, a mixed bed ion exchanger and a bed consisting of activated carbon, wherein said mixed bed ion exchanger comprises a mixture of anion exchange beads and cation exchange beads, wherein the diameter of the beads of the mixed bed ion exchanger is less than 0.5 mm, and the anion exchange beads and the cation exchange beads are monodisperse, respectively, wherein the ultrafilter comprises a bundle of hydrophilic hollow fiber membranes having a pore size and a hydrophobic vent membrane of microfiltration grade having a larger pore size than said pore size of the ultrafiltration membranes, and wherein a total resin bed height is between 10 and 25 cm, and wherein said resin bed is contained in a cartridge in tube form having an inner diameter between 65 and 75 mm.

2. A method according to claim 1, wherein the purified water is ultrapure water.

3. A method according to claim 1, wherein the mixed bed ion exchanger is based on styrene divinylbenzene.

4. A method according to claim 1, wherein the method comprises a further step of treating water by reverse osmosis and/or a further step of treating water by electrodeionization, wherein the step of treating water by reverse osmosis and the step of treating water by electrodeionization are performed prior to the step of passing water through the mixed bed ion exchanger, and also prior to passing the water through the ultrafilter.

5. A module comprising an ultrafilter, a bed consisting of activated carbon, and a mixed bed ion exchanger comprising beads having a diameter of less than 0.5 mm, the mixed bed ion exchanger comprising a mixture of anion exchange beads and cation exchange beads, with the anion exchange beads and the cation exchange beads being monodisperse, respectively, wherein the ultrafilter is located upstream of the mixed bed ion exchanger, and the bed consisting of activated carbon is located upstream of the mixed bed ion exchanger or downstream of the mixed bed ion exchanger, wherein the ultrafilter comprises a bundle of hydrophilic hollow fiber membranes having a pore size and a hydrophobic vent membrane of microfiltration grade having a larger pore size than said pore size of the ultrafiltration membranes, and wherein a total resin bed height in said module is between 10 and 25 cm, and wherein said resin bed is contained in a cartridge in tube form having an inner diameter between 65 and 75 mm.

6. A module according to claim 5, wherein in that the mixed bed ion exchanger is based on styrene divinylbenzene.

7. A water treatment system for producing ultrapure water comprising an ultrafilter, a bed consisting of activated carbon, and a mixed bed ion exchanger comprising beads having a diameter of less than 0.5 mm, wherein the mixed bed ion exchanger comprises a mixture of anion exchange beads and cation exchange beads, with the anion exchange beads and the cation exchange beads being monodisperse, respectively, wherein the ultrafilter is located upstream of said mixed bed ion exchanger, and the bed consisting of activated carbon is located upstream of the mixed bed ion exchanger or downstream of the mixed bed ion exchanger, wherein the ultrafilter comprises a bundle of hydrophilic hollow fiber membranes having a pore size and a hydrophobic vent membrane of microfiltration grade having a larger pore size than said pore size of the ultrafiltration membranes, and wherein a total resin bed height is between 10 and 25 cm, and wherein said resin bed is contained in a cartridge in tube form having an inner diameter between 65 and 75 mm.

8. A water treatment system according to claim 7, wherein the ultrafilter and the mixed bed ion exchanger are provided in a single module comprising an ultrafilter and a mixed bed ion exchanger comprising beads having a diameter of less than 0.5 mm.

9. A water treatment system according to claim 7, wherein the ultrafilter and the mixed bed ion exchanger are provided in at least two modules.

10. A water treatment system according to claim 7, wherein the bed consisting of activated carbon is provided in a further module, comprising the bed consisting of activated carbon.

11. A water treatment system according to claim 10, wherein said further module further comprises a mixed bed ion exchanger comprising beads having a diameter of less than 0.5 mm.

* * * * *